(12) United States Patent
Van Wiemeersch et al.

(10) Patent No.: US 12,739,040 B2
(45) Date of Patent: Sep. 15, 2026

(54) SYSTEM AND METHOD FOR TARGETED COMMUNICATION

(71) Applicant: Ford Global Technologies, LLC, Dearborn, MI (US)

(72) Inventors: John Robert Van Wiemeersch, Novi, MI (US); Brendan Diamond, Grosse Pointe, MI (US); Mahmoud Yousef Ghannam, Canton, MI (US); Stuart C. Salter, White Lake, MI (US); Christopher Storms, Madison Heights, MI (US)

( * ) Notice: Subject to any disclaimer, the term of this patent is extended or adjusted under 35 U.S.C. 154(b) by 419 days.

(21) Appl. No.: 18/521,874

(22) Filed: Nov. 28, 2023

(65) Prior Publication Data

US 2025/0175261 A1 May 29, 2025

(51) Int. Cl.
*H04B 11/00* (2006.01)

(52) U.S. Cl.
CPC .................................... *H04B 11/00* (2013.01)

(58) Field of Classification Search
CPC ...... H04B 11/00; H04B 7/0617; G10K 15/02; G10L 25/03; G10L 25/27; G10L 25/48
See application file for complete search history.

(56) References Cited

U.S. PATENT DOCUMENTS 4,349,898 A * 9/1982 Drewes ................... F41B 15/00 367/138
5,515,026 A * 5/1996 Ewert .................... B60Q 1/525 340/384.1
6,044,795 A * 4/2000 Matsuura ............ A01K 11/004 119/51.02
7,146,011 B2 * 12/2006 Yang ...................... G10K 11/26 381/116
(Continued)

FOREIGN PATENT DOCUMENTS

CN 120074684 A * 5/2025 ............. G10L 25/27
CN 120646632 A * 9/2025 ............. B66B 27/00
(Continued)

OTHER PUBLICATIONS

Translation of JP-2004295781 (Year: 2004).*
(Continued)

*Primary Examiner* — Daniel Pihulic
(74) *Attorney, Agent, or Firm* — Frank Lollo; Eversheds Sutherland (US) LLP

(57) ABSTRACT

A system for directional communication is disclosed. The system may include an ultrasonic beamforming device, sensors, and a processor. The ultrasonic beamforming device may be configured to transmit an ultrasonic carrier wave. The processor may be configured to obtain inputs from a detection unit located in a geographical area and detect an object presence in the geographical area based on the inputs. The processor may be further configured to determine an
(Continued)

object location in the geographical area based on the inputs. The processor may additionally determine an optimum sound frequency to modulate the ultrasonic carrier wave. Furthermore, the processor may cause the ultrasonic beam-forming device to transmit the ultrasonic carrier wave modulated at the optimum sound frequency towards the object location.

20 Claims, 5 Drawing Sheets

(56) References Cited

U.S. PATENT DOCUMENTS

| | | | | |
|---|---|---|---|---|
| 8,009,844 | B2 * | 8/2011 | Whillock | H04B 10/11 381/124 |
| 9,042,201 | B2 * | 5/2015 | Tyler | H04B 11/00 367/139 |
| 10,299,064 | B2 | 5/2019 | Di Censo et al. | |
| 11,368,231 | B1 * | 6/2022 | Dodds | G06F 3/165 |
| 11,425,493 | B2 * | 8/2022 | Hassani | H04R 3/12 |
| 11,616,580 | B1 * | 3/2023 | Dodds | G06F 3/162 367/135 |
| 2004/0264707 | A1 * | 12/2004 | Yang | G10K 15/02 381/79 |
| 2011/0096941 | A1 | 4/2011 | Marzetta et al. | |
| 2015/0110333 | A1 * | 4/2015 | Norris | H04R 19/02 381/394 |
| 2021/0211823 | A1 | 7/2021 | Shani et al. | |
| 2022/0176165 | A1 | 6/2022 | Scalisi et al. | |
| 2022/0201389 | A1 * | 6/2022 | Hassani | H04R 1/323 |
| 2025/0175261 | A1 * | 5/2025 | Van Wiemeersch | H04B 11/00 |
| 2025/0294307 | A1 * | 9/2025 | Alkan | B66B 3/002 |

FOREIGN PATENT DOCUMENTS

| | | | | |
|---|---|---|---|---|
| DE | 102021134181 | A1 * | 6/2022 | G08B 21/18 |
| DE | 102024134513 | A1 * | 5/2025 | G10L 25/27 |
| EP | 4617215 | A1 * | 9/2025 | B66B 27/00 |
| JP | 2004295781 | A * | 10/2004 | |
| WO | WO-9933189 | A1 * | 7/1999 | A01K 5/023 |
| WO | WO-03019125 | A1 * | 3/2003 | G10K 11/26 |
| WO | WO-2025038204 | A2 * | 2/2025 | G01S 15/42 |

OTHER PUBLICATIONS

Audio Spotlight by Holosonics, Introducing Xseries Audio Spotlight by Holosonics: Focused Audio Technology, https://www.holosonics.com, May 2023, pp. 1-7.

The Hypersonic Soundbeam, WFMU's Beware of the Blog, https://blog.wfmu.org/freeform/2007/12/the-hypersonic.html, Dec. 5, 2007, pp. 1-3.

* cited by examiner 108
112
110
224
308
302
306
116
304
118
104
102
100

SYSTEM AND METHOD FOR TARGETED COMMUNICATION

FIELD

The present disclosure relates to a system and method for targeted communication using a directional speaker installed in a garage.

BACKGROUND

Many users have workshops in their garages or prefer to work from their vehicles parked in the garages. While working from a garage, some users may desire to hear music or receive important messages, e.g., from intercom or other communication systems. Typically, users wear headphones or earphones to hear music or messages when they are in their garages.

While headphones may enable a user to hear music/messages, it may not be convenient for the user to wear headphones for a long time duration while working from the garage. Further, many modern headphones have noise cancellation features that may not enable the user to hear other sounds originating from the garage. For example, the user may not hear sounds from user's kids, pets, etc. who may also be present in the garage. The user may desire to hear such sounds to be aware that the kids, pets, etc. are comfortable in the garage.

The user may also use garage or vehicle speakers to hear music or messages. However, sound waves emitted from the garage or vehicle speakers may be heard by other users as well who may be in proximity to the garage, thus causing inconvenience to them.

There may also be scenarios where the user may desire to startle or alarm strangers or wild animals who may be attempting to enter the garage. In such instances, the user may desire the vehicle or garage infrastructure to output alarm signals when a stranger or a wild animal attempts to enter the garage. While such alarm signals may frighten off the stranger or the wild animal, the alarm signals may also be heard by other users (e.g., user's neighbors), which may cause inconvenience to them.

Thus, there is a need for a system that enables sound emission in a garage without causing inconvenience to users who may be in proximity to the garage.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
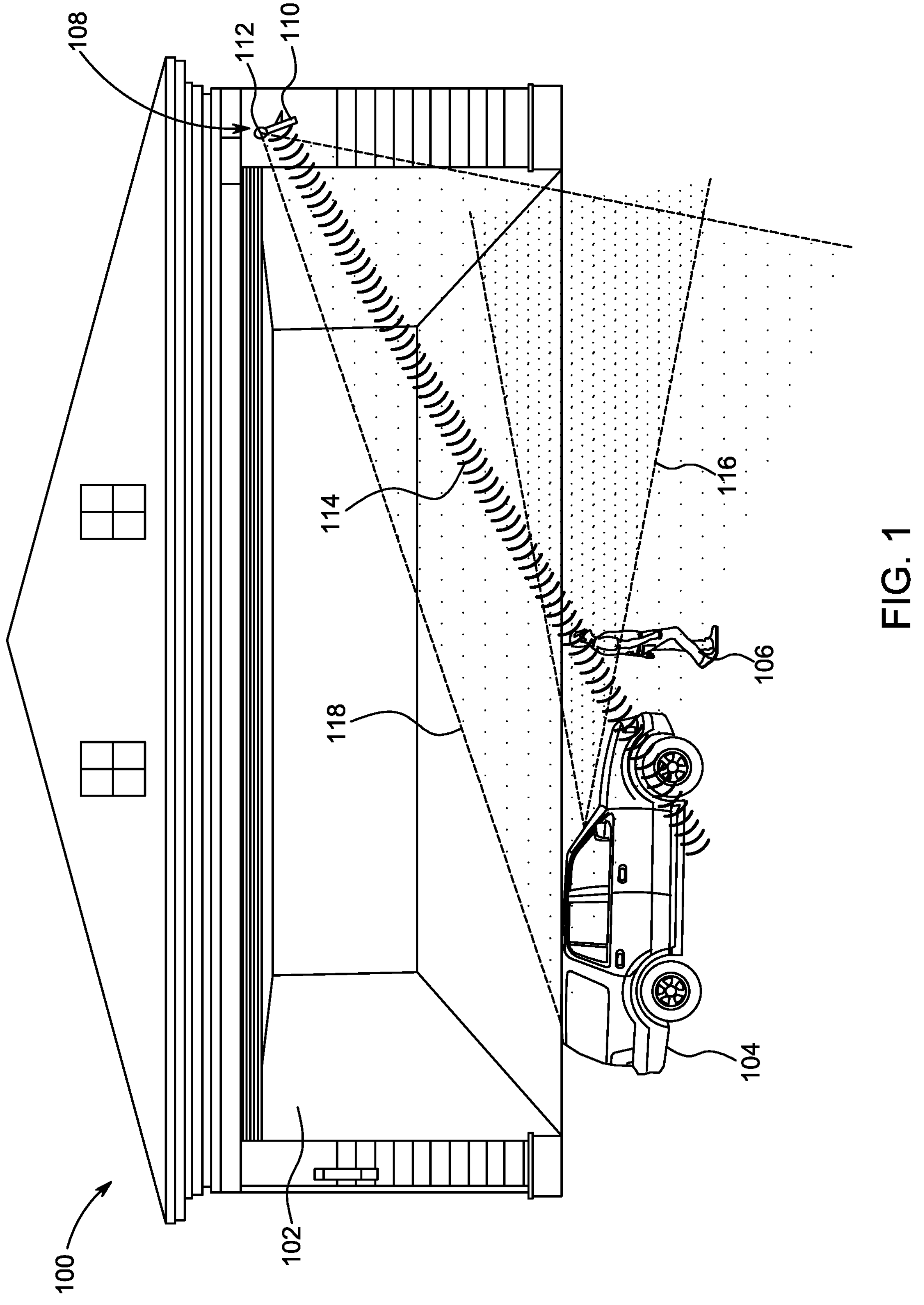
FIG. 1 depicts an example environment in which techniques and structures for providing the systems and methods disclosed herein may be implemented.

The present disclosure describes a system and method for directional or targeted communication. The system may be disposed in a garage or outside a garage, and may include an ultrasonic beamforming device that may be configured to transmit an ultrasonic carrier wave. In some aspects, the ultrasonic beamforming device may be a Hypersonic™ speaker. The ultrasonic beamforming device may be configured to transmit directional or targeted sound focused on a target object (e.g., a person or an animal), such that only the target object hears the sound and not other persons/animals who may be in proximity to the target object. The system may be configured to cause the ultrasonic beamforming device to emit the ultrasonic carrier wave modulated at an optimum sound frequency, such that the target object may conveniently hear the sound delivered via the modulated ultrasonic carrier wave. Specifically, based on an object type (e.g., whether the object is a human or an animal), the system may cause the ultrasonic beamforming device to emit the ultrasonic carrier wave modulated at a frequency within a hearing frequency range associated with the object type, thus enabling the object to hear the sound delivered via the modulated ultrasonic carrier wave.

In some aspects, the system may be configured to obtain inputs from one or more detection units that may be disposed outside the garage, e.g., on a garage exterior wall (or in the garage), and determine an object location in proximity to the garage (e.g., in proximity to the garage exterior wall) based on the obtained inputs. The detection units may be, for example, system cameras and/or microphones, cameras and/or sensors installed in a vehicle parked outside the garage, one or more cameras/sensors installed outside the garage, and/or the like. Responsive to determining the object location in proximity to the garage, the system may define a target zone including the object location, such that other users/animals who may be present in proximity to the garage or in the garage may be excluded from the target zone.

The system may further determine the object type based on the inputs obtained from the detection unit, and an optimum sound frequency to modulate the ultrasonic carrier wave based on the object type. The optimum sound frequency may be within the hearing frequency range associated with the object type. Responsive to determining the optimum sound frequency, the system may cause the ultrasonic beamforming device to emit the ultrasonic carrier wave modulated at the determined optimum sound frequency in the target zone, so that the object in the target zone may hear the sound delivered via the modulated ultrasonic carrier wave.

In further aspects, the system may alter sound pressure level (SPL) or volume of the sound delivered via the modulated ultrasonic carrier wave based on the object type. As an example, the system may increase the sound SPL/volume when an unknown person or a stray animal may be located in proximity to the garage (e.g., near the garage exterior wall), to startle or frighten off the unknown person or the stray animal and prevent them from entering the garage. Further, the system may reduce the sound SPL/volume when a known person or a pet animal may be approaching the garage or may be present in the garage.

The present disclosure discloses a system for directional communication that may deliver sound to a target object in or outside a garage and not to other users/animals, thereby not disturbing the other users/animals. The system may further determine an optimum sound frequency within a hearing frequency range of the object to deliver the sound, so that only the targeted object may hear the sound. For example, if both a dog and a human are in the beam of the ultrasonic speaker, the system could choose to modulate at ultrasonic frequencies above that of human hearing, so the dog hears the targeted beamformed alert, but the human does not. This two-level delivery of sound is convenient if the alert to the dog is intended to be at a high SPL to frighten the dog away. The system may further modify the sound SPL/volume based on the object. For example, if a user is known to have hearing disability, the system may increase the sound SPL/volume for the sound delivered to the user via the ultrasonic beamforming device. The system may enable a user to conveniently hear music or messages without disturbing other users. The system may further startle and/or frighten off unknown persons or stray animals that may approach or enter the garage by delivering targeted sounds/messages to the persons/animals, without disturbing others.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102, and a vehicle 104 that may be parked outside the geographical area 102, as shown in FIG. 1. In some aspects, the geographical area 102 may be a garage associated with a vehicle user home or a hotel/motel. In other aspects, the geographical area 102 may be an area outside of a garage. Hereinafter, the geographical area 102 is referred to as garage 102.

The vehicle 104 may take the form of any passenger or commercial vehicle such as, for example, a car, a work vehicle, a crossover vehicle, a truck, a van, a minivan, a taxi, a bus, etc. Further, the vehicle 104 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

The environment 100 may further include a user 106 who may be, for example, a vehicle owner, a garage user/owner or a person known to the vehicle or garage owner (i.e., a "known person"). In other aspects, the user 106 may be a stranger or a person not known to the vehicle or garage owner (i.e., an "unknown person"). The user 106 may be located in proximity to the garage 102 (e.g., near a garage exterior wall or a garage door), as shown in FIG. 1, or inside the garage 102 (not shown).

The environment 100 may further include a directional communication system 108 (or system 108) that may be configured to deliver audible signals or sound to only a specific target (or more than one target) using a narrow column of ultrasonic waves as carrier beam, which may be modulated to generate either audible sound (to humans and animals) or ultrasonic sound (only detectable by certain animals at certain frequencies). For example, the system 108 may be configured to transmit/deliver sound to only the user 106, and not to any other user or animal (not shown in FIG. 1) who may be present in proximity to the garage 102 or inside the garage 102. Since the system 108 transmits sound targeted only towards the user 106, other users/animals present in proximity to the garage 102 may not be disturbed by the sound.

In some aspects, the system 108 may include an ultrasonic beamforming device 110 that may be, for example, a Hypersonic™ speaker. The ultrasonic beamforming device 110 may be configured to transmit an ultrasonic carrier wave having a frequency higher than hearing or audible frequency range of humans or animals. For example, the frequency of the ultrasonic carrier wave may be in a range of 100 k Hz to 125 k Hz. The system 108 may modulate the ultrasonic carrier wave to enable delivery of audible sound to the user 106. A person ordinarily skilled in the art may appreciate that a carrier wave may be modulated by performing amplitude modulation or frequency modulation. In accordance with the present disclosure, the system 108 modulates the ultrasonic carrier wave emitted by the ultrasonic beamforming device 110 by performing frequency modulation, so that the ultrasonic carrier wave may be modulated at an optimum sound frequency that may be in a hearing frequency range of the intended target (e.g., the user 106).

Example use cases of the system 108 are described below. The use cases described below should not be construed as limiting, and the system 108 may be used in other manners as well, different from the manners described below, without departing from the present disclosure scope.

As a first example use case, when the user 106 may be the vehicle owner or the garage owner, the user 106 may transmit a request to the system 108 to receive a predefined sound, e.g., music, from the ultrasonic beamforming device 110. The user 106 may transmit the request to the system 108 via a vehicle Human-Machine Interface ("HMI", shown as HMI 216 in FIG. 2) or a user device (shown as user device 202 in FIG. 2) that may be communicatively coupled with the system 108. Responsive to receiving the request from the user 106 (via the vehicle HMI or the user device), the system 108 may fetch the requested music data from a system memory (shown as system memory 222 in FIG. 2), the user device or the vehicle 104 (that may be communicatively coupled with the system 108). Responsive to fetching the music data, the system 108 may modulate the ultrasonic carrier wave to a frequency within a hearing frequency range of a human (e.g., between 20 Hz-20 k Hz), and transmit/deliver the music data to the user 106 (specifically targeted towards a user's head) via the modulated ultrasonic carrier wave.

The modulated ultrasonic carrier wave may be focused towards a user's head and may be transmitted as a narrow column of ultrasonic wave, so that it reaches only the user 106 and not to any other user/animal who may be present in the garage 102. Specifically, responsive to receiving the request from the user 106 to receive the music, the system 108 may determine a user's location in proximity to the garage 102 (or in the garage 102). In some aspects, the system 108 may determine the user location in proximity to the garage 102 by obtaining inputs from a system camera(s) 112, a vehicle detection unit (e.g., vehicle cameras, vehicle sensors, etc.), one or more garage cameras or sensors (not shown), and/or the like. Responsive to determining the user location in proximity to the garage 102, the system 108 may define a target zone 114 including the user's head (as shown in FIG. 1) based on the determined user location. The target zone 114 may be a narrow zone or column such that only the user 106 (specifically the user's head) may be present in the target zone 114, and any other user/animal present in proximity to the garage 102 or in the garage 102 may be excluded from the target zone 114. Responsive to defining the target zone 114, the system 108 may cause the ultrasonic beamforming device 110 to transmit/deliver the music in the target zone 114 to the user 106 via the modulated ultrasonic carrier wave, so that the music may reach only the user 106 and may not disturb other users/animals present in or in proximity to the garage 102.

The system 108 may further "track" or monitor user's movement in proximity to the garage 102 based on the inputs obtained from the cameras/sensors described above. In some aspects, the system 108 may obtain data feeds (e.g., images, videos, sensor data, etc.) from multiple sources (cameras/sensors) based on their respective field of views (FOVs), to monitor the user movement in proximity to the garage 102. For example, the system 108 may monitor the user movement based on the inputs/data feeds obtained from the vehicle detection unit when the user 106 may be in a vehicle detection unit's FOV 116, as shown in FIG. 1. Similarly, the system 108 may monitor the user movement based on the inputs/data feeds obtained from the system camera 112 when the user 106 may be in a system camera's FOV 118. The system 108 may obtain the inputs/data feeds from multiple sources simultaneously or may obtain inputs/data feeds from one source at a time.

When the system 108 detects that the user 106 may be moving in proximity to the garage 102, the system 108 may cause the ultrasonic beamforming device 110 to also move (e.g., mechanically and/or electrically) and follow the user movement in proximity to the garage 102, so that the user 106 continues to receive the modulated ultrasonic carrier wave (and hence the music) when the user 106 moves in proximity to the garage 102. In this manner, the system 108 enables the user 106 to hear music, without affecting other users/animals in or in proximity to the garage 102. Further, by using the system 108, the user 106 may not be required to wear headphones or earphones when the user 106 may be working in the garage 102 and prefers to hear music privately, but also wishes to still hear other sounds in their surrounding environment, thereby enhancing user's convenience.

In some aspects, the modulated ultrasonic carrier wave emitted by the ultrasonic beamforming device 110 may get scattered or blocked by objects or artifacts present outside or in the garage 102, when the ultrasonic beamforming device 110 may be moving to follow the user movement. In order to prevent the modulated ultrasonic carrier wave from getting scattered or blocked and to ensure that the user 106 receives uninterrupted music, the system 108 (specifically the ultrasonic beamforming device 110) may be mounted in proximity to a garage wall top portion (e.g., a top portion of an exterior garage wall), so that the modulated ultrasonic carrier wave may have an unobstructed access to the user 106.

As a second example use case, when the user 106 may be a person known to the vehicle/garage owner (e.g., spouse, kid, etc.), the system 108 may transmit preset messages to the user 106 when the system 108 detects the user presence in proximity to the garage 102 (e.g., when the user 106 may be approaching the garage 102) or in the garage 102. In some aspects, the system 108 may detect the user presence in proximity to the garage 102 based on the inputs obtained from the cameras/sensors described above. Responsive to detecting the user presence, the system 108 may determine a user location in proximity to the garage 102 and define the target zone 114 based on the determined user location, as described above. The system 108 may then fetch (e.g., from the system memory) a preset message associated with the user 106. In some aspects, the preset message may be pre-stored in the system memory by the vehicle/garage owner. As an example, the present message may be, "Mr. Smith will be back home at 4 PM". Responsive to fetching the preset message, the system 108 may cause the ultrasonic beamforming device 110 to transmit/deliver the message in the target zone 114 to the user 106 via the modulated ultrasonic carrier wave, so that the message reaches only the user 106 and not to any other user/animal who may be present in proximity to the garage 102 (e.g., approaching the garage 102).

As a third example use case, when the user 106 may be a person not known to the vehicle/garage owner (e.g., an unknown person/stranger), the system 108 may transmit a preset message to the user 106 in the same manner as described above; however, the preset message may be different from the example message described above. For example, in the case of an unknown person/stranger, the preset message may be "Please exit the premises immediately" or "Your image is being recorded while on our property". The messages may also be sent in different languages common to the locale and alternate between languages.

In some aspects, the system 108 may determine whether the user 106 is a known person or an unknown person based on the inputs obtained from the cameras described above and facial recognition technology. Specifically, the system 108 may compare the facial features of the user 106 identified from the images/videos obtained from the cameras with the facial features of known persons that may be pre-stored in the system memory. The system 108 may determine that the user 106 may be a known person when the user facial features match with the stored facial features, and may determine that the user 106 may be an unknown person when the user facial features do not match with the stored facial features.

As a fourth example use case, when an animal may be present proximity to in the garage 102 (e.g., approaching the garage 102 via the garage front door), the system 108 may determine an animal location around or in proximity to the garage 102 and an animal type based on the inputs obtained from the cameras/sensors described above. The animal type may be, for example, a dog, a cat, a raccoon, a wolf, a coyote, etc. The system 108 may further determine whether the animal present in proximity to the garage 102 may be a pet animal associated with the vehicle/garage owner based on the obtained inputs (e.g., by comparing captured animal images with pet animal images pre-stored in the system memory), or a stray animal who may have approached or entered the garage 102.

Responsive to determining the animal type (e.g., dog), the system 108 may modulate the ultrasonic carrier wave emitted by the ultrasonic beamforming device 110 to an optimum sound frequency that may be within the hearing frequency range associated with the determined animal type (e.g., 45 k Hz max for a dog). The system 108 may further define a target zone including the animal location (in the same manner as the system 108 defines the target zone 114), and cause the ultrasonic beamforming device 110 to transmit the ultrasonic carrier wave modulated at the optimum sound frequency towards the target zone, so that the animal may receive the wave and hear the sound (and no other animal in proximity to or in the garage 102 may be disturbed by the sound).

In some aspects, when the animal may be a stray animal, the sound delivered via the ultrasonic carrier wave modulated at the optimum sound frequency may startle and/or frighten the animal away from the garage 102. In the same aspect, if a pet animal may also be present in the target zone 114 the system 108 may cause a preset message (stored by the vehicle/garage owner in the system memory) to be delivered to the pet animal in human voice, via the ultrasonic carrier wave modulated at the optimum sound frequency. The preset message may be, for example, "No, Scott", "Come here, Scott", etc. In this case, two messages may be delivered simultaneously; one to startle and/or frighten off the stray animal and one to command the pet animal to stay. Since the message to the pet animal may be delivered in the voice of the vehicle/garage owner (and hence known to the animal), the pet animal may stay near or in the garage 102 and not attempt to pursue the stray animal.

Further details of the system 108 and additional use cases are described below in conjunction with FIG. 2.

The vehicle 104 and the system 108 implement and/or perform operations, as described here in the present disclosure, in accordance with the owner manual and safety guidelines. In addition, any action taken by the user 106 based on messages or notifications provided by the vehicle 104 and/or the system 108 should comply with all the rules specific to the location and operation of the vehicle 104 (e.g., Federal, state, country, city, etc.). The messages or notifications, as provided by the vehicle 104 and/or the system 108 should be treated as suggestions and only followed according to any rules specific to the location and operation of the vehicle 104.

Figure 2:
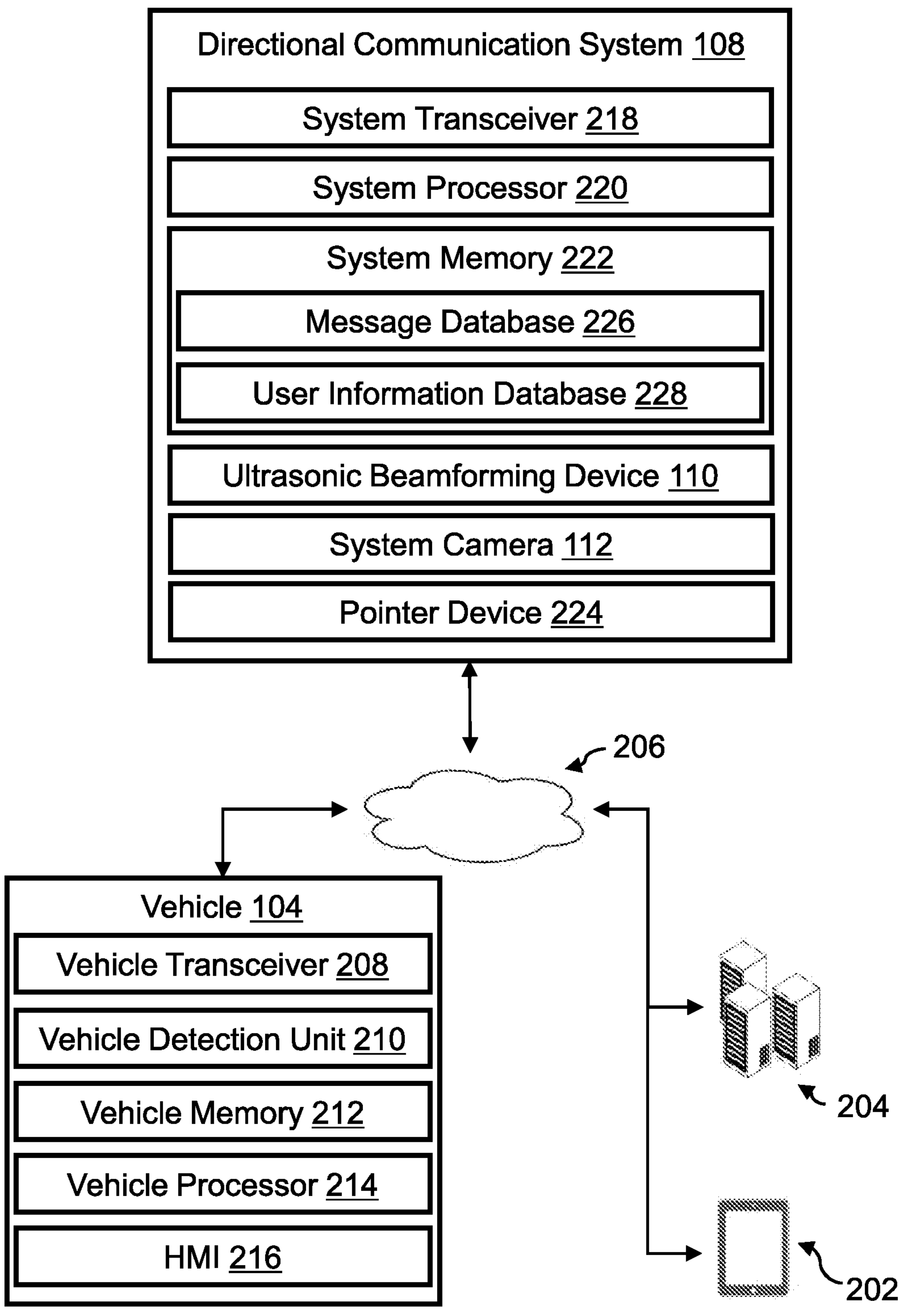
FIG. 2 depicts a block diagram of a directional communication system in accordance with the present disclosure.

FIG. 2 depicts a block diagram of the directional communication system 108 in accordance with the present disclosure. FIG. 2 will be described in conjunction with FIGS. 3 and 4.

The system 108 may be communicatively coupled with the vehicle 104, a user device 202 and one or more servers 204 (or server 204) via one or more networks 206 (or network 206). The user device 202 may be associated with the vehicle/garage owner, and may include, for example, a mobile phone, a laptop, a computer, a tablet, a smart or display key fob, a wearable device, or any other similar device with communication capabilities. The server 204 may be part of a cloud-based computing infrastructure and may be associated with and/or include a Telematics Service Delivery Network (SDN) that provides digital data services to the vehicle 104 and/or the garage 102 (and other vehicles and/or garages not shown in FIG. 2). In further aspects, the server 204 may be configured to store music data, a plurality of preset messages provided by the vehicle/garage owner, facial features/images of the vehicle/garage owner and persons known to the vehicle/garage owner, images of pet animals associated with the vehicle/garage owner, and/or the like. The server 204 may transmit the information described above to the system 108 at a predefined frequency, or when the system 108 transmits a request to the server 204 to obtain the information.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 104 may include a plurality of units including, but not limited to, a vehicle transceiver 208, a vehicle detection unit 210, a vehicle memory 212, a vehicle processor 214 and a vehicle Human-Machine Interface 216 (HMI 216). The vehicle detection unit 210 may include vehicle cameras, ultrasonic sensors, Radio Detection and Ranging (radar) sensors, Light Detection and Ranging (lidar) sensors, vehicle microphones (with or without audio recording feature), and/or the like. The vehicle detection unit 210 may be configured to capture images of a geographical area (and/or audio signals) in proximity to the vehicle 104.

The HMI 216 may be configured to receive user inputs to control vehicle operation and/or user requests to control system operation. As an example, the vehicle/garage owner may input a request on the HMI 216 to receive music from the system 108.

The vehicle transceiver 208 may be configured to transmit/receive signals/information/data to/from external systems and devices via the network 206. For example, the vehicle transceiver 208 may transmit information/signals/data obtained from the vehicle detection unit 210 to the system 108 via the network 206. As another example, the vehicle transceiver 208 may transmit the user request received from the HMI 216 to the system 108 via the network 206.

The vehicle processor 214 may be disposed in communication with one or more memory devices disposed in communication with the respective computing systems (e.g., the vehicle memory 212 and/or one or more external databases not shown in FIG. 2). The vehicle processor 214 may utilize the vehicle memory 212 to store programs in code and/or to store data for performing aspects in accordance with the disclosure. The vehicle memory 212 may be a non-transitory computer-readable storage medium or memory storing a program code that enables the vehicle processor 214 to perform operations in accordance with the present disclosure. The vehicle memory 212 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the vehicle processor 214 may be configured to analyze the images and/or audio signals captured by the vehicle detection unit 210 and control vehicle operation based on the analysis. For example, the vehicle processor 214 may cause vehicle exterior lights to illuminate or flash and/or vehicle exterior speakers to output predefined notifications/alarms when the vehicle processor 214 detects that a person or an animal may be present in proximity to the vehicle 104, based on the image/audio signal analysis. The vehicle processor 214 may be further configured to control operation of one or more vehicle components (e.g., vehicle exterior lights, speakers, etc.) based on command signals obtained from the system 108 (via the vehicle transceiver 208 and the network 206).

The system 108 may include a system transceiver 218, a system processor 220, a system memory 222, a pointer device 224, the ultrasonic beamforming device 110 and the system camera 112. The system transceiver 218 may be configured to transmit/receive signals/information/data to/from external systems and devices including the vehicle 104, the user device 202 and the server 204 via the network 206.

The system processor 220 may be disposed in communication with one or more memory devices disposed in communication with the respective computing systems (e.g., the system memory 222 and/or one or more external databases not shown in FIG. 2). The system processor 220 may utilize the system memory 222 to store programs in code and/or to store data for performing aspects in accordance with the disclosure. The system memory 222 may be a non-transitory computer-readable storage medium or memory storing a program code that enables the system processor 220 to perform operations in accordance with the present disclosure. The system memory 222 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the system memory 222 may include a plurality of databases including, but not limited to, a message database 226 and a user information database 228. The message database 226 may store preset messages associated with known persons, unknown persons, pet animals, stray animals, etc., provided by the vehicle/garage owner to the system 108 via the user device 202 and/or the HMI 216. In other aspects, the preset messages may be provided by the server 204 to the system 108, and hence to the message database 226 for storage purpose. The vehicle/garage owner or the server 204 may provide the preset messages to the message database 226 for storage purpose, so that when the system 108 detects a user/animal in the garage 102, the system 108 may cause the ultrasonic beamforming device 110 to output the preset messages associated with the detected user/animal. In some aspects, the message database 226 and the user information database 228 may be shared with neighboring system 108 or remote family members who also have the system 108.

The user information database 228 may store images and/or facial features associated with the vehicle/garage owner or persons known to the vehicle/garage owner. The user information database 228 may further store images of pet animals associated with the vehicle/garage owner. The user information database 228 may obtain the images/facial features described above from the user device 202, the HMI 216 or the server 204 via the network 206.

Figure 3:
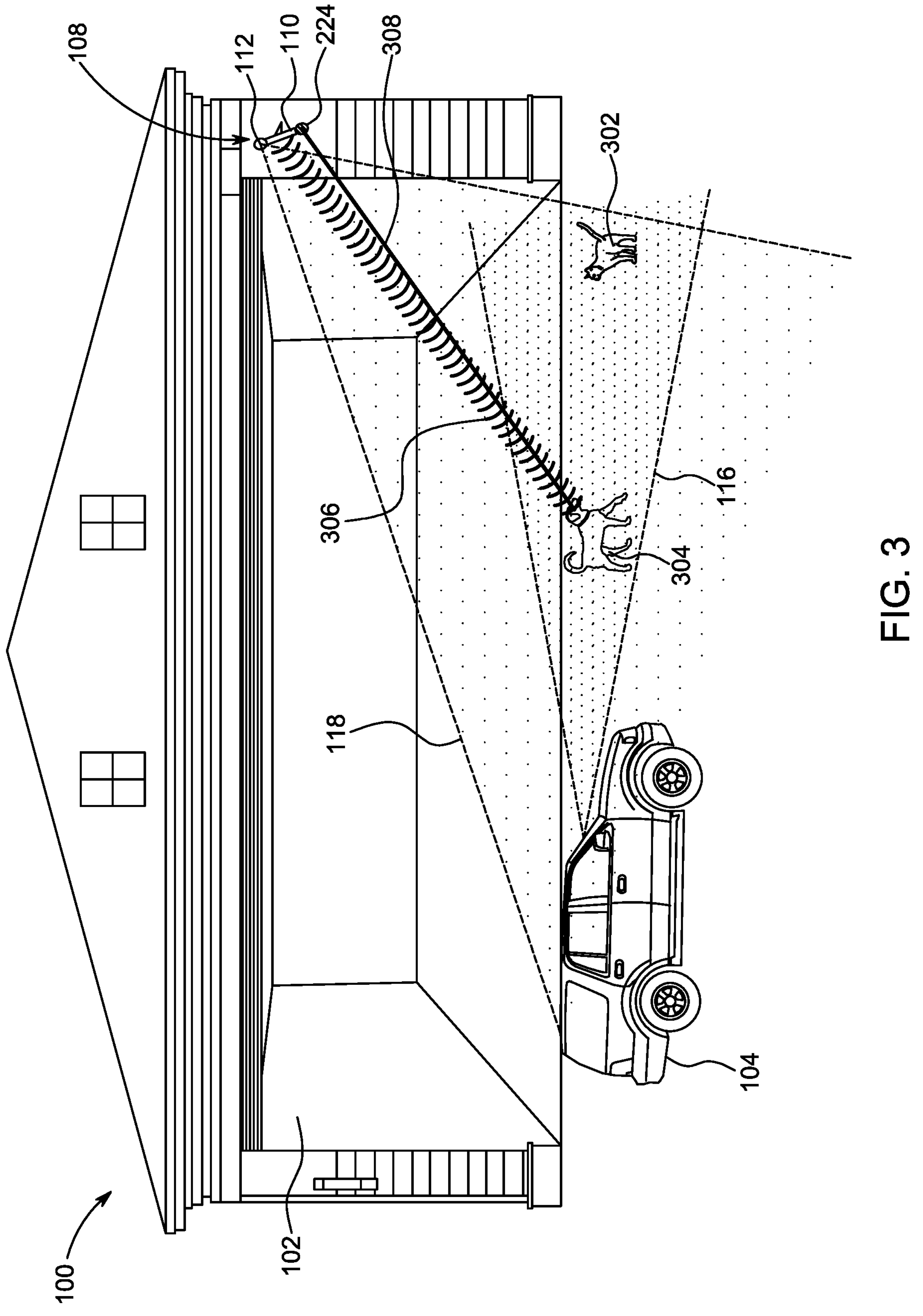
FIG. 3 depicts an example snapshot of one or more animals present in proximity to a garage in accordance with the present disclosure.

The pointer device 224 may be an indicator of where the ultrasonic speaker may be pointed and may be configured to emit an infrared light or a red light in the direction of object location, when the system 108 detects that the person or the animal may be approaching or may have already entered the garage 102. In some aspects, the pointer device 224 emits the infrared light or the red light to enable a closed loop system where the camera can see where the ultrasonic speaker is pointed and maintain a "lock" to the target position (i.e., position of an unknown person or a stray animal), so that the system camera 112 may follow the infrared light or the red light (from the ultrasonic beamforming device 110) to track/monitor the target movement of persons or animal approaching or in proximity to the garage 102. The pointer device 224 may be disposed in proximity to the system camera 112 and/or the ultrasonic beamforming device 110, as shown in FIG. 3.

As described above, the ultrasonic beamforming device 110 may be configured to transmit an ultrasonic carrier wave, which, for example, may have a frequency in a range of 100 k Hz to 125 k Hz. The ultrasonic beamforming device 110 may be, for example, a Hypersonic™ speaker. Further, the system camera 112 may be, for example, a Red-Green-Blue (RGB) camera, an infrared camera, a thermal camera, and/or the like.

The system 108 may further include one or more additional components that are not shown in FIG. 2. For example, the system 108 may include a system microphone, one or more system sensors, mechanical connection points that enable system connection and angular movement (lateral and/or vertical movement) on the garage wall, standard speaker for wide area/angle sound broadcast, and/or the like.

In operation, the system transceiver 218 may receive inputs from the vehicle detection unit 210, the system camera 112, the system microphone, the system sensors, one or more garage sensors/cameras/microphone that may be installed on the exterior wall of the garage 102 or in the garage 102, and/or the like (collectively referred to as "detection unit" located outside or in the garage 102). In some aspects, the system transceiver 218 may also receive inputs from cameras or microphones that may be installed in homes/buildings in proximity to the garage 102 and/or other vehicles that may be parked in proximity to the garage 102. The received inputs may be, for example, images and/or audio signals captured by the detection unit. The system transceiver 218 may transmit the received inputs to the system processor 220.

The system processor 220 may obtain the inputs from the system transceiver 218, and detect a presence of an object (e.g., a person or an animal) in proximity to the garage 102 (or in the garage 102) based on the obtained inputs. For example, the system processor 220 may detect that a known person (e.g., the user 106 shown in FIG. 1), an unknown person (e.g., a stranger 402 shown in FIG. 4), a pet animal (e.g., pet animals 302 or 404 shown in FIGS. 3 and 4), or a stray animal (e.g., a stray animal 304 shown in FIG. 3) may be present/located in proximity to the garage 102 (e.g., near the garage front door or exterior wall) or in the garage 102 based on the inputs obtained from the system transceiver 218.

In some aspects, the system processor 220 may be an Artificial Intelligence (AI)/Machine Learning (ML) based processor that may additionally be configured to determine an object location in proximity to the garage 102 and an object type based on the inputs obtained from the system transceiver 218, responsive to detecting the object presence in proximity to or in the garage 102. The object type may be, for example, the vehicle/garage owner, a known person, a known person with hearing disability, an unknown person or stranger, a pet animal, a stray animal, and/or the like. If the object is an animal (pet animal or stray animal), the object type may further include information associated with whether the animal is a dog, a cat, a raccoon, a wolf, a coyote, a sheep, a rabbit, etc. In some aspects, the system processor 220 may determine the object type by comparing object features and/or images identified from the inputs obtained from the detection unit with the images/facial features of the vehicle/garage owner, known persons, pet animal(s) and other animals that may be stored in the user information database 228 and/or the server 204. In some aspects, the system processor 220 may determine the object type (e.g., in case of known persons and the vehicle/garage owner) by using facial recognition technology.

Responsive to determining the object location in proximity to the garage 102, the system processor 220 may define a target zone (e.g., the target zone 114 shown in FIG. 1 or a target zone 306 shown in FIG. 3) in proximity to the garage 102 including the object location, specifically a head portion of the detected object. For example, as shown in FIG. 1, the target zone 114 may include a head portion of the user 106, and as shown in FIG. 3, the target zone 306 may include a head portion of the stray animal 304. In some aspects, the defined target zone may exclude any other user/animal that may be approaching or located in proximity to the garage 102 (or in the garage 102). For example, as shown in FIG. 3, the target zone 306 does not include the pet animal 302.

Further, responsive to determining the object type, the system processor 220 may determine an optimum sound frequency to modulate the ultrasonic carrier wave that may be emitted by the ultrasonic beamforming device 110, based on the determined object type. The optimum sound frequency may be within a hearing frequency range associated with the determined object type. For example, the system processor 220 may determine the optimum sound frequency within the range of 20 Hz-20 k Hz when the system processor 220 determines the object type to be a human (e.g., the user 106 shown in FIG. 1). Similarly, the system processor 220 may determine the optimum sound frequency within the range of 50 Hz-45 k Hz when the system processor 220 determines the object type to be a dog (e.g., the stray animal 304 shown in FIG. 3).

Responsive to defining the target zone and determining the optimum sound frequency, the system processor 220 may cause the ultrasonic beamforming device 110 to transmit the ultrasonic carrier wave modulated at the determined optimum sound frequency in the target zone. Since the ultrasonic carrier wave is modulated at the optimum sound frequency and transmitted in the target zone, only the intended or targeted recipient of the wave receives the sound, and the sound is not received by any other person or animal. For example, as shown in FIG. 3, when the ultrasonic beamforming device 110 transmits the ultrasonic carrier wave in the target zone 306, the ultrasonic carrier wave only reaches the stray animal 304 and does not reach the pet animal 302, thereby ensuring that the pet animal 302 is not disturbed.

The system processor 220 may be configured to deliver auditory information or sound to the object via the ultrasonic carrier wave modulated at the optimum sound frequency. For example, if the user 106 is the vehicle/garage owner, the system processor 220 may fetch music data requested or preferred by the user 106 from the system memory 222, the vehicle memory 212 or the user device 202 and deliver the music to the user 106 via the ultrasonic carrier wave transmitted in the target zone 114. In some aspects, to deliver the auditory information to the object, the system processor 220 may first determine the auditory information to be delivered based on the object type. The system processor 220 may determine the auditory information by using a mapping of auditory information with different object types that may be provided by the vehicle/garage owner and pre-stored in the user information database 228.

For example, when the object type is an unknown person (e.g., the user 106), the system processor 220 may determine the auditory information to be provided to the unknown person based on the mapping of auditory information with different object types stored in the user information database 228. In this case, the auditory information may be a preset message that the vehicle/garage owner may desire to be output to an unknown person, whenever the system processor 220 determines that the unknown person may be approaching the garage 102 or may have entered the garage 102. Responsive to determining the auditory information/preset message associated with an unknown person, the system processor 220 may cause the ultrasonic beamforming device 110 to transmit the preset message to the unknown person via the ultrasonic carrier wave modulated at the optimum sound frequency within a hearing frequency range of a human. The preset message may be, for example, "Exit the premises immediately".

In further aspects, when the object type is an unknown person, the system processor 220 may transmit (via the system transceiver 218) a command signal to the vehicle transceiver 208, to cause the vehicle processor 214 to illuminate (e.g., flash) vehicle exterior lights and/or output audible alerts via vehicle exterior speakers or horn. The flashing of the vehicle exterior lights and/or the output audible alerts may startle and frighten away the unknown person. In a similar manner, the system processor 220 may cause multiple vehicles (not shown) located in proximity to the system 108 to illuminate their respective exterior lights and/or output audible alerts when the system processor 220 detects an unknown person in proximity to the garage 102.

As another example, when the object type is a known person, the preset message may be, for example, "No one is at home right now". As yet another example, when the object type is the vehicle/garage owner, the auditory information may be the music data requested or preferred by the vehicle/garage owner, as described above. As yet another example, when the object type is a pet animal, the preset message may be, for example, "Come on, Scott", "No, Scott", etc.

In further aspects, the system processor 220 may cause the auditory information to be delivered to the object at an optimal sound pressure level (SPL) or volume based on the object type. For example, if the object type is an unknown person or a stray animal (e.g., the stray animal 304), the system processor 220 may cause the auditory information to be delivered to the object at a higher SPL (e.g., 60 dB or more) to startle and frighten away the unknown person or the stray animal. As another example, if the object is a known person with hearing disability or a medical condition, the system processor 220 may cause the preset message to be delivered to the object at a higher SPL, so that the person may conveniently hear the message. As yet another example, if the object is a known person with hearing disability or a medical condition, the system processor 220 may cause the preset message to be delivered to the object at a low SPL that gradually increases to a higher SPL, so that the person is not startled by the message arriving instantly at their ears.

To determine the optimal SPL, the system processor 220 may use a mapping of SPLs with different object types that may be provided by the vehicle/garage owner and pre-stored in the user information database 228. The system processor 220 may correlate the mapping with the determined object type to determine the optimal SPL at which the auditory information/preset message may be delivered to the object. Responsive to determining the optimal SPL, the system processor 220 may cause the ultrasonic beamforming device 110 to deliver the auditory information at the optimal SPL to the object via the ultrasonic carrier wave modulated at the optimum sound frequency.

In some aspects, the system processor 220 may "track" or monitor object movement in proximity to the garage 102 (or in the garage 102) when the object approaches or enters the garage 102, as described above in conjunction with FIG. 1. The system processor 220 may monitor the object movement by using the system camera 112 and ensure the ultrasonic wave is locked on the target by causing the pointer device 224 to emit an infrared light or a red light 308 to visually "lock" the sound on the object (e.g., the stray animal 304) in the garage 102, as shown in FIG. 3. The system processor 220 may cause the ultrasonic beamforming device 110 to continue transmitting the ultrasonic carrier wave modulated at the optimum sound frequency in the target zone 306 as the stray animal 304 approaches or moves into the garage 102, thereby ensuring that the stray animal 304 continues to receive the auditory information even when the stray animal 304 may be moving. In some aspects, the system processor 220 may follow a similar process to "lock" the object by using the light 308 emitted from the pointer device 224, when the object may be the vehicle/garage owner, a known or unknown person or a pet animal, so that the object may continue to receive the auditory information during object movement.

The system processor 220 may implement one or more additional processes to startle and frighten off unknown persons or the stray animal 304 from the garage 102 by using the ultrasonic beamforming device 110. For example, the system processor 220 may cause the ultrasonic beamforming device 110 to oscillate or move the ultrasonic carrier beam back and forth or in multiple directions to cause reflection of the ultrasonic carrier wave from one or more surfaces present in or in proximity to the garage 102, alter auditory information/sound packet frequency or SPL based on a distance from the garage wall on which the system 108 may be installed or a distance from the system 108, time duration spent by the object in proximity to the garage 102, and/or the like. For example, the system processor 220 may cause the ultrasonic beamforming device 110 to increase the SPL when the stray animal 304 may be getting close to the garage 102 that includes the system 108. In some aspects, the system processor 220 may reduce the SPL if the pet animal 302 enters the target zone 306, to ensure that the pet animal 302 does not receive high-volume sound.

The system processor 220 may further cause the standard speaker included in the system 108 to emit/broadcast predefined alert notifications (e.g., in human voice) when the unknown person or the stray animal 304 does not exit the garage 102 or stays in proximity to the garage 102 even after receiving the ultrasonic carrier beam emitted from the ultrasonic beamforming device 110 for a time duration greater than a predefined threshold time duration. In some aspects, when the system 108 does not include the standard speaker, the system processor 220 may transmit, via the system transceiver 218, a command signal to the vehicle 104, causing the vehicle 104 to emit the alert notifications via vehicle exterior speakers (and/or lights). In this case, the system 108 may be used to emit sound using ultrasonic carrier beam that only the intended recipient may hear, and the vehicle exterior speakers may be used to broadcast alert notifications that other users may also hear.

Figure 4:
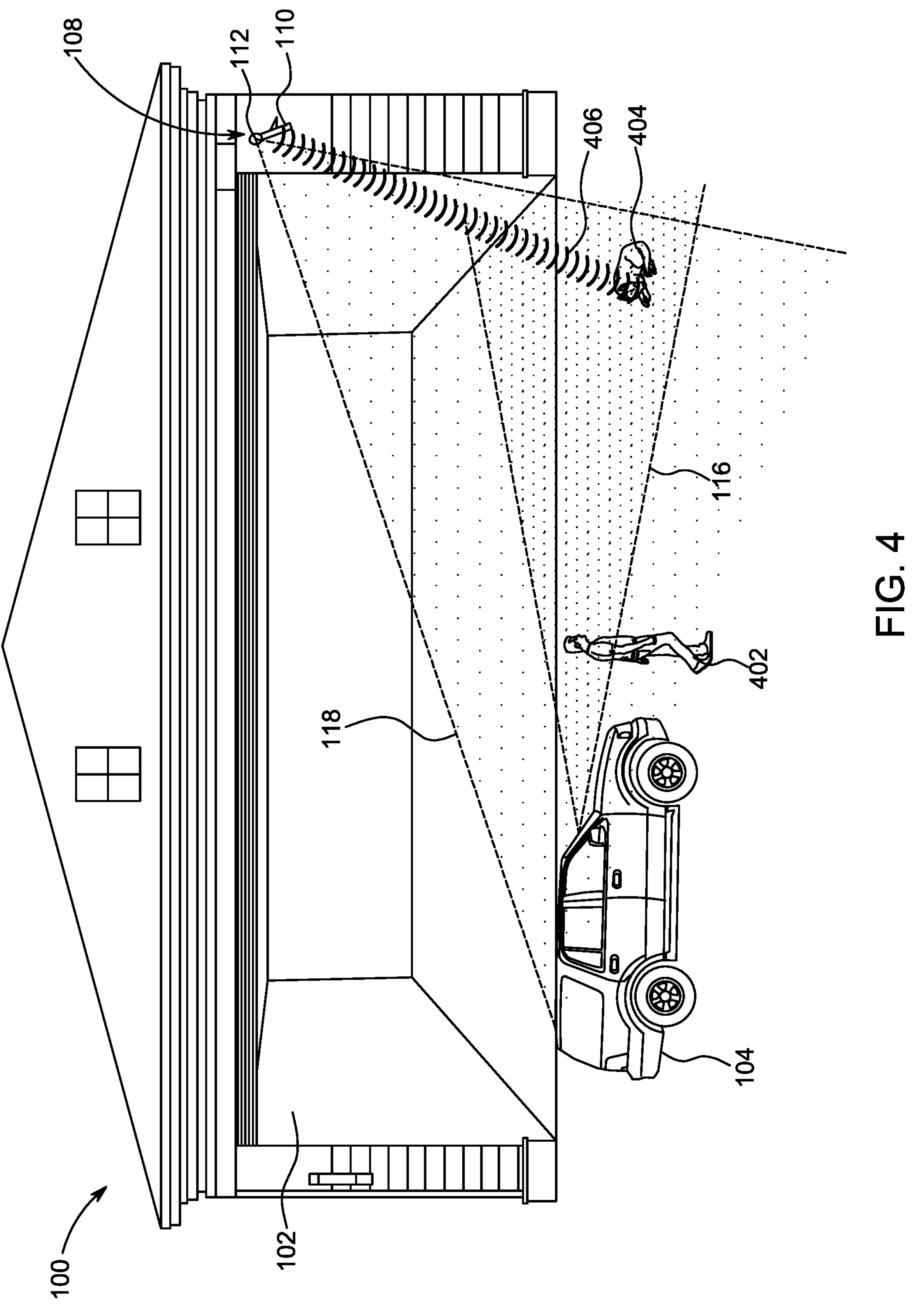
FIG. 4 depicts a snapshot of a user and a pet animal present in proximity to a garage in accordance with the present disclosure.

Although the description above describes an aspect where the system processor 220 causes the ultrasonic beamforming device 110 to transmit the ultrasonic carrier beam towards the detected user/animal, in some aspects, the system processor 220 may additionally or alternatively cause the ultrasonic beamforming device 110 to transmit the ultrasonic carrier beam towards other users or animals to alert them of the detected user/animal, specifically when the detected user/animal may be an unknown person or a stray animal. For example, as shown in FIG. 4, when the stranger 402 may be present in proximity to the garage 102, the system processor 220 may cause the ultrasonic beamforming device 110 to transmit the ultrasonic carrier beam towards the pet animal 404 to alert and wake up the pet animal 404. In this case, the system processor 220 may first determine a pet animal location in proximity to or in the garage 102 based on the inputs obtained from the detection unit. Responsive to determining the pet animal location, the system processor 220 may define a target zone 406 including the pet animal location, as described above. The system processor 220 may then cause the ultrasonic beamforming device 110 to transmit the ultrasonic carrier beam modulated at a frequency that may be within the hearing frequency range of the pet animal 404 in the target zone 406, so that the pet animal 404 may hear the sound/wake-up alert. Responsive to receiving the sound/wake-up alert from the ultrasonic beamforming device 110, the pet animal 404 may wake-up and respond to the stranger 402 to startle or frighten off the stranger 402 (e.g., bark at the stranger 402).

The system 108 may further be used in one or more additional use cases, as described below. For example, the system 108 may be used to transmit a message to a specific person in a gathering, when a plurality of people may be having a party or a get-together in the garage 102 (or any other location). As another example, the system 108 may be used to transmit a message to a specific person on a couch, when more than one persons may be sitting or sleeping on the couch. The system 108 may also be used to beam a television signal to a specific person.

As another example, the system 108 may produce and direct a vehicle door locking chirp or alarm to a user to confirm a vehicle lock when the user locks the vehicle door using a key fob when, for example, the user may have parked outside or may be entering the garage 102 late at night (or entering a hotel/motel late at night). In this manner, the vehicle door locking alarm may be heard only by the user and not by other users/neighbors in proximity to the garage 102. The system 108 may similarly direct the alarm signal to the user when the user inadvertently trips a door alarm or a key fob panic alarm.

The system 108 may additionally be used as a sounder that may be configured to direct sound to specific people or a group of people who may be in proximity to a vehicle (e.g., the vehicle 104) or approaching the vehicle. The sound may communicate vehicle presence or vehicle location to the people, instead of using a standard speaker or loudspeaker that may disturb other unintended users.

In further aspects, the system 108 may be configured to direct sound to more than one target user. In this case, the system processor 220 may determine an optimum width of a target zone based on a count of target users identified from the inputs obtained from the detection unit. Responsive to determining the optimum target zone width, the system processor 220 may define the target zone based on the optimum target zone width and cause the ultrasonic beamforming device 110 to transmit the ultrasonic carrier wave modulated at a frequency within a human hearing frequency range in the target zone. The optimum target zone width may be such that all the target users may be included in the target zone, and other users different from the target users may be excluded from the target zone.

The system 108 may further focus the modulated ultrasonic carrier wave at a sound reflective location or object (e.g., a reflective hard and smooth surface) that may enable the sound to be reflected and heard by the target users. In this case, the system 108 may focus the modulated ultrasonic carrier wave at the sound reflective location or object by using an infrared light or a red light (e.g., the light 308), as described above.

Figure 5:
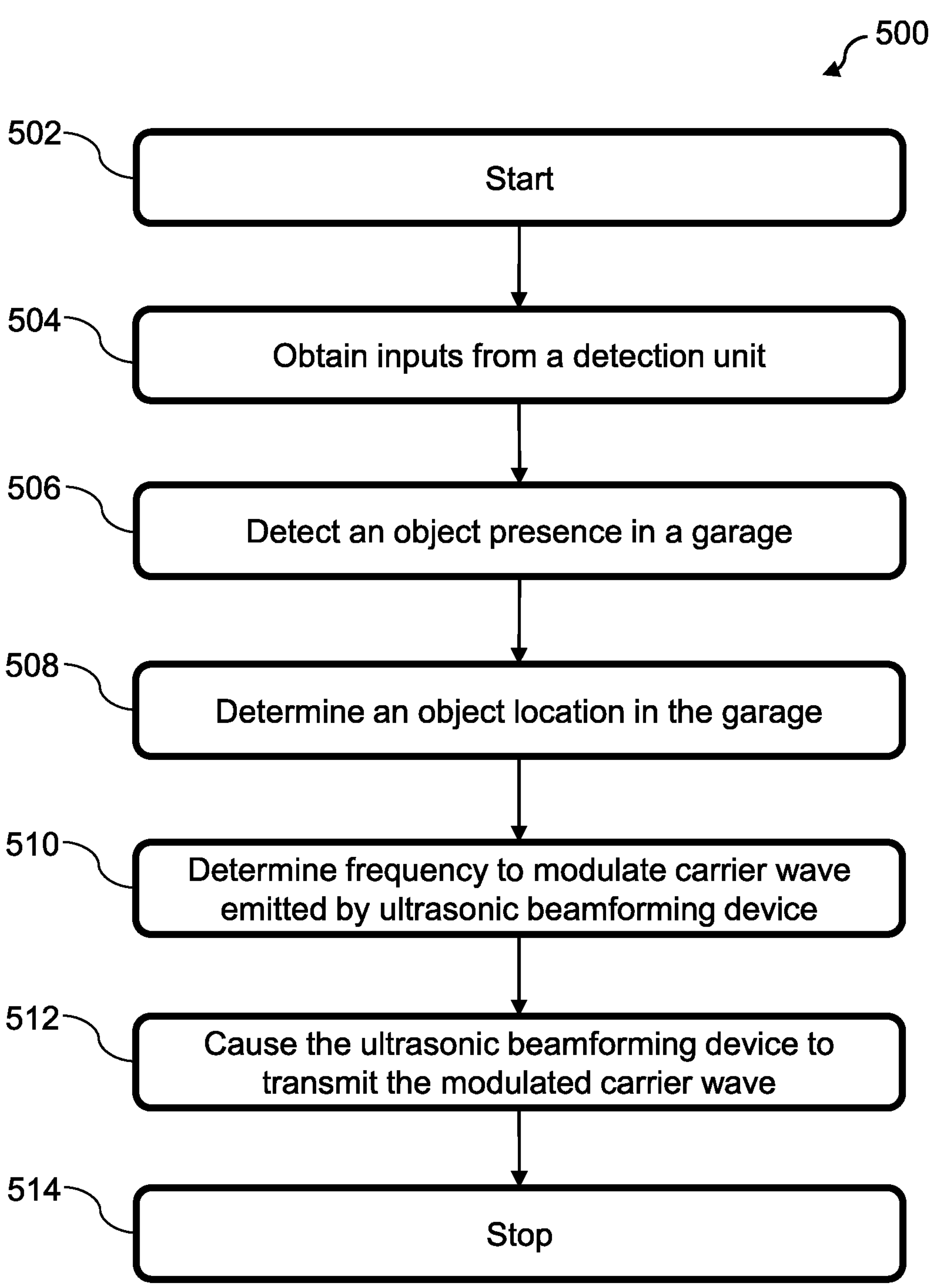
FIG. 5 depicts a flow diagram of an example method for directional communication in accordance with the present disclosure.

FIG. 5 depicts a flow diagram of an example method 500 for directional communication in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the system processor 220, the inputs from the detection unit. At step 506, the method 500 may include detecting, by the system processor 220, an object presence (e.g., a presence of a person or an animal) in proximity to the garage 102 or in the garage 102 based on the inputs obtained from the detection unit. At step 508, the method 500 may include determining, by the system processor 220, an object location in proximity to the garage 102 based on the inputs obtained from the detection unit responsive to detecting the object presence in proximity to the garage 102. At step 510, the method 500 may include determining, by the system processor 220, an optimum sound frequency to modulate the ultrasonic carrier wave that may be emitted by the ultrasonic beamforming device 110. At step 512, the method 500 may include causing, by the system processor 220, the ultrasonic beamforming device 110 to transmit the ultrasonic carrier wave modulated at the optimum sound frequency towards the determined object location.

At step 514, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for directional communication, the system comprising:

an ultrasonic beamforming device configured to transmit an ultrasonic carrier wave in a geographical area; and a processor communicatively coupled with the ultrasonic beamforming device, wherein the processor is configured to:

obtain inputs from one or more detection units located in or adjacent to the geographical area, wherein the one or more detection units comprises a vehicle detection unit of a vehicle parked in or adjacent to the geographical area;

detect a presence of an object in the geographical area based on the inputs;

determine an object location in the geographical area based on the inputs responsive to detecting the presence;

determine an optimum sound frequency to modulate the ultrasonic carrier wave responsive to detecting the presence; and cause the ultrasonic beamforming device to transmit the ultrasonic carrier wave modulated at the optimum sound frequency towards the object location.

2. The system of claim 1, wherein the processor is further configured to:

define a target zone in the geographical area comprising the object location; and cause the ultrasonic beamforming device to transmit the ultrasonic carrier wave modulated at the optimum sound frequency in the target zone responsive to defining the target zone.

3. The system of claim 2, wherein the target zone excludes any other object exterior to the target zone.

4. The system of claim 1, wherein the processor is further configured to:

determine an object type based on the inputs; and determine the optimum sound frequency based on the object type.

5. The system of claim 4, wherein the object type is one of a known person, an unknown person, a pet animal or an animal different from the pet animal.

6. The system of claim 4, wherein the optimum sound frequency is in a hearing frequency range associated with the object type.

7. The system of claim 4, wherein the processor is further configured to:

determine auditory information to be delivered to the object based on the object type; and cause the ultrasonic beamforming device to deliver the auditory information to the object via the ultrasonic carrier wave modulated at the optimum sound frequency.

8. The system of claim 7, wherein the processor is further configured to:

determine an optimal sound pressure level associated with the auditory information based on the object type; and cause the ultrasonic beamforming device to deliver the auditory information at the optimal sound pressure level to the object via the ultrasonic carrier wave modulated at the optimum sound frequency.

9. The system of claim 1, further comprising a pointer device configured to emit light towards the object location.

10. The system of claim 1, wherein the processor is further configured to:

determine a location of a pet animal in the geographical area based on the inputs; and cause the ultrasonic beamforming device to transmit the ultrasonic carrier wave modulated at the optimum sound frequency towards the location of the pet animal.

11. The system of claim 1, wherein the vehicle detection unit comprises at least one of a Red-Green-Blue (RGB) camera, an Infrared camera, a thermal camera, a microphone, and one or more sensors disposed in the geographical area.

12. The system of claim 1, wherein the geographical area is associated with a garage, and wherein the one or more detection units further comprises a system detection unit installed on the garage.

13. The system of claim 1, wherein the ultrasonic beamforming device is a Hypersonic™ speaker.

14. The system of claim 1, wherein the processor is further configured to oscillate the ultrasonic beamforming device in multiple directions to cause reflection of the ultrasonic carrier wave from one or more surfaces present in the geographical area.

15. A method for directional communication, the method comprising:

obtaining, by a processor, inputs from one or more detection units located in or adjacent to a geographical area, wherein the one or more detection units comprises a vehicle detection unit of a vehicle parked in or adjacent to the geographical area;

detecting, by the processor, a presence of an object in the geographical area based on the inputs;

determining, by the processor, an object location in the geographical area based on the inputs responsive to detecting the presence;

determining, by the processor, an optimum sound frequency to modulate an ultrasonic carrier wave emitted by an ultrasonic beamforming device, responsive to detecting the presence; and causing, by the processor, the ultrasonic beamforming device to transmit the ultrasonic carrier wave modulated at the optimum sound frequency towards the object location.

16. The method of claim 15, further comprising:

defining a target zone in the geographical area comprising the object location; and causing the ultrasonic beamforming device to transmit the ultrasonic carrier wave modulated at the optimum sound frequency in the target zone responsive to defining the target zone.

17. The method of claim 16, wherein the target zone excludes any other object exterior to the target zone.

18. The method of claim 15, further comprising:

determining an object type based on the inputs; and determining the optimum sound frequency based on the object type.

19. The method of claim 18, wherein the optimum sound frequency is in a hearing frequency range associated with the object type.

20. A non-transitory computer-readable storage medium having instructions stored thereupon which, when executed by a processor, cause the processor to:

obtain inputs from one or more detection units located in or adjacent to a geographical area, wherein the one or more detection units comprises a vehicle detection unit of a vehicle parked in or adjacent to the geographical area;

detect a presence of an object in the geographical area based on the inputs;

determine an object location in the geographical area based on the inputs responsive to detecting the presence;

determine an optimum sound frequency to modulate an ultrasonic carrier wave emitted by an ultrasonic beamforming device, responsive to detecting the presence; and cause the ultrasonic beamforming device to transmit the ultrasonic carrier wave modulated at the optimum sound frequency towards the object location.

* * * * *